United States Patent [19]

Steckel et al.

[11] Patent Number: 5,709,517
[45] Date of Patent: Jan. 20, 1998

[54] APPARATUS FOR UNLOADING OF BULK MATERIAL FROM THE CARGO HOLDS OF SHIPS

[75] Inventors: Horst Steckel, St. Ingbert-Rohrbach; Jürgen Arend, Saarbrücken, both of Germany

[73] Assignee: Krupp Fordertechnik GmbH, Dusseldorf, Germany

[21] Appl. No.: 737,106

[22] PCT Filed: Mar. 1, 1996

[86] PCT No.: PCT/EP96/00878

§ 371 Date: Oct. 22, 1996

§ 102(e) Date: Oct. 22, 1996

[87] PCT Pub. No.: WO96/27545

PCT Pub. Date: Sep. 12, 1996

[30] Foreign Application Priority Data

Mar. 3, 1995 [DE] Germany ............ 195 07 375.4

[51] Int. Cl.⁶ .................................................. B65G 67/60
[52] U.S. Cl. .................... 414/140.9; 198/509; 414/141.7
[58] Field of Search ..................... 414/140.9, 141.2, 414/141.7, 141.8; 198/509, 549, 550.2

[56] References Cited

U.S. PATENT DOCUMENTS

| 2,796,180 | 6/1957 | Rose | 414/140.9 |
| 4,218,168 | 8/1980 | Parsons | 414/141.8 X |

FOREIGN PATENT DOCUMENTS

| 589536 | 3/1994 | European Pat. Off. | |
| 618848 | 9/1935 | Germany. | |
| 3403016 | 8/1985 | Germany. | |
| 58-59131 | 6/1983 | Japan. | |
| 161285 | 3/1964 | U.S.S.R. | 414/141.2 |

*Primary Examiner*—Janice L. Krizek
*Attorney, Agent, or Firm*—Herbert Dubno; Andrew Wilford

[57] ABSTRACT

An apparatus for unloading bulk material from a ship adjacent a dock has a portal support movable longitudinally on the dock parallel to the ship and carrying a boom having an inner end pivoted about an inner axis on the support and an outer end positionable over the ship. A conveyor extends between the ends of the boom and a catch bin is provided on the outer end of the boom above the conveyor. An outrigger arm pivotal on the outer end of the boom about an outer axis has an outer end over which passes a cable from which is suspended a grab. A winch connected to the cable can raise the grab from a position in a hold of the ship to a position above the catch bin. The arm is then pivoted to position the grab above the catch bin and then material is dumped from the grab into the catch bin so that it can be conveyed to the dock by the boom conveyor.

7 Claims, 2 Drawing Sheets

5,709,517

APPARATUS FOR UNLOADING OF BULK MATERIAL FROM THE CARGO HOLDS OF SHIPS

CROSS REFERENCE TO RELATED APPLICATIONS

This application is the US national phase of PCT application PCT/EP96/00878 filed 1 Mar. 1996 with a claim to the priority of German application 195 07 375.4 filed 3 Mar. 1995.

FIELD OF THE INVENTION

The invention relates to an apparatus movable parallel to a ship to be unloaded for unloading of bulk material from the cargo holds of ships by means of a raisable and lowerable boom with a grab that is operated by a cable and that dumps the bulk material taken out of the cargo hold of the ship into a catch bin.

BACKGROUND OF THE INVENTION

The known apparatuses of the described type are all constructed according to the same principle, that is the ship is unloaded by means of a grab of a volumetric capacity suitable to the size of the ship to be unloaded which is moved horizontally and vertically by a winch and a trolley movable back and forth on the boom. In addition the entire unloading apparatus is movable on the dock parallel to the ship to be unloaded over the entire length of the hold of the ship.

As a rule with these known apparatuses the support frame is provided over the dock with a catch bin in which the bulk material taken out of the ship by the grab is dropped. Thus the grab must travel from the pickup location in the ship hold to the drop-off location of the bulk material over the catch bin, moving a relatively long distance both horizontally and vertically while full and also on return while empty. The time thus wasted and the maximum number of working cycles is determined by the unloading capacity of a large grab that is filled completely up and that itself weighs quite a bit. The weight of the grab corresponds however to the capacity of the entire apparatus such that the known apparatuses have a very great weight even when empty. The initial setup costs and the operation costs are also correspondingly high. These are the main disadvantages of the known apparatuses.

OBJECTS OF THE INVENTION

SUMMARY OF THE INVENTION

It is an object of the invention to substantially shorten the travel path of the grab in order to reduce its weight so that the apparatus can be less expensive and thus more cheaply designed.

These objects are attained by an apparatus of the above-described type wherein the catch bin is provided on the water-side end of the boom, the boom is provided with a boom belt extending to underneath the catch bin, a pivotal outrigger arm is provided on the water-side end of the boom and is controlled by the lift cable of the grab that is moved by a winch.

The apparatus according to the invention has a completely new conception relative to the known and described apparatus. Thus with the apparatus according to the invention no horizontal movement of the grab is needed because the catch bin is positioned in the region above the ship hatch. The slight horizontal movement of the grab that is necessary in order to bring the grab into the correct dumping position over the catch bin and back is effected by the pivotal outrigger arm. The outrigger arm makes it possible to move the grab, after taking up bulk material and after raising the grab by means of the winch to a position near the edge of the catch bin, by pivoting back into the dumping position over the catch bin and then back again. This process is repeated with each working cycle of the grab. The pivotal movement of the pivotal outrigger is conformed in use to the current boom inclination.

As a result of the relatively short travel, the grab can be made substantially smaller and therefore lighter. Since however the weight of the grab determines the design of the entire apparatus, the apparatus according to the invention can be at least 50% lighter than the known apparatuses.

The possibility of raising and lowering the outrigger arm by means of the boom in a certain range and thus to maintain the catch bin always as close as possible over the ship hatch, makes it possible to reduce the vertical grab movement always to the minimal necessary path between the upper surface of the bulk material and the dumping height of the grab above the catch bin.

With the apparatus according to the invention there are in addition positive secondary advantages that relate back to the spilling of particulate material from the grab when it is moved. In the known devices in spite of expensive precautions it is impossible to prevent the particulate material from being spilled on the ship, on the dock, and in particular in the water. This is a particular pollution problem with problematic materials, such as sulfur, fertilizer, salts, and the like. Such a pollution problem is completely eliminated by the apparatus according to the invention.

According to a feature of the invention the boom is pivotal about a vertical axis. As a result of the possible pivotal movement of the boom and its movability parallel to the ship every possible point in the region of the ships hatch openings can be reached by the grab without the grab itself, as in the known devices, having to be shifted horizontally.

When changing hatches it is easily possible to get around structures on the ship between the hatches, such as masts, cranes or the like as well as raised hatch lids. Getting around these structures by pivoting up the water-side section of the boom as in the known devices is not necessary with the apparatus according to the invention. Thus with a fixed pivot point of the pivotal and rotatable boom only the upper edge of the ship hatches need be taken into account; the height of the structures has no influence on the apparatus according to the invention.

According to a further embodiment of the invention the boom belt is reversible and a loading device is provided in the region of the pivot axis of the boom. An apparatus thus constructed can be used for unloading as well as for loading ships.

The described known apparatuses are only usable for loading and unloading ships when an additional belt boom was provided on the portal of the system. This necessitates a considerable technical expense and thus ensures correspondingly higher additional costs.

With the apparatus according to the invention the bulk material can be dumped directly into the ship in a loading operation from an unloading point of the boom belt at the water-side end of the boom.

For dust-free movement of the bulk material into the interior of the ship according to a further feature of the invention a telescoping chute, a corrugated-edge belt, a bucket loader or the like is suspended on the water-side end of the boom. This also makes possible a gentle loading of the particular material.

On use of the apparatus according to the invention to unload a ship the loading device is swung by means of a winch into a rest position underneath the boom.

BRIEF DESCRIPTION OF THE DRAWINGS

The invention is more closely described with reference to the drawing. Therein.

SPECIFIC DESCRIPTION

Figure 1:
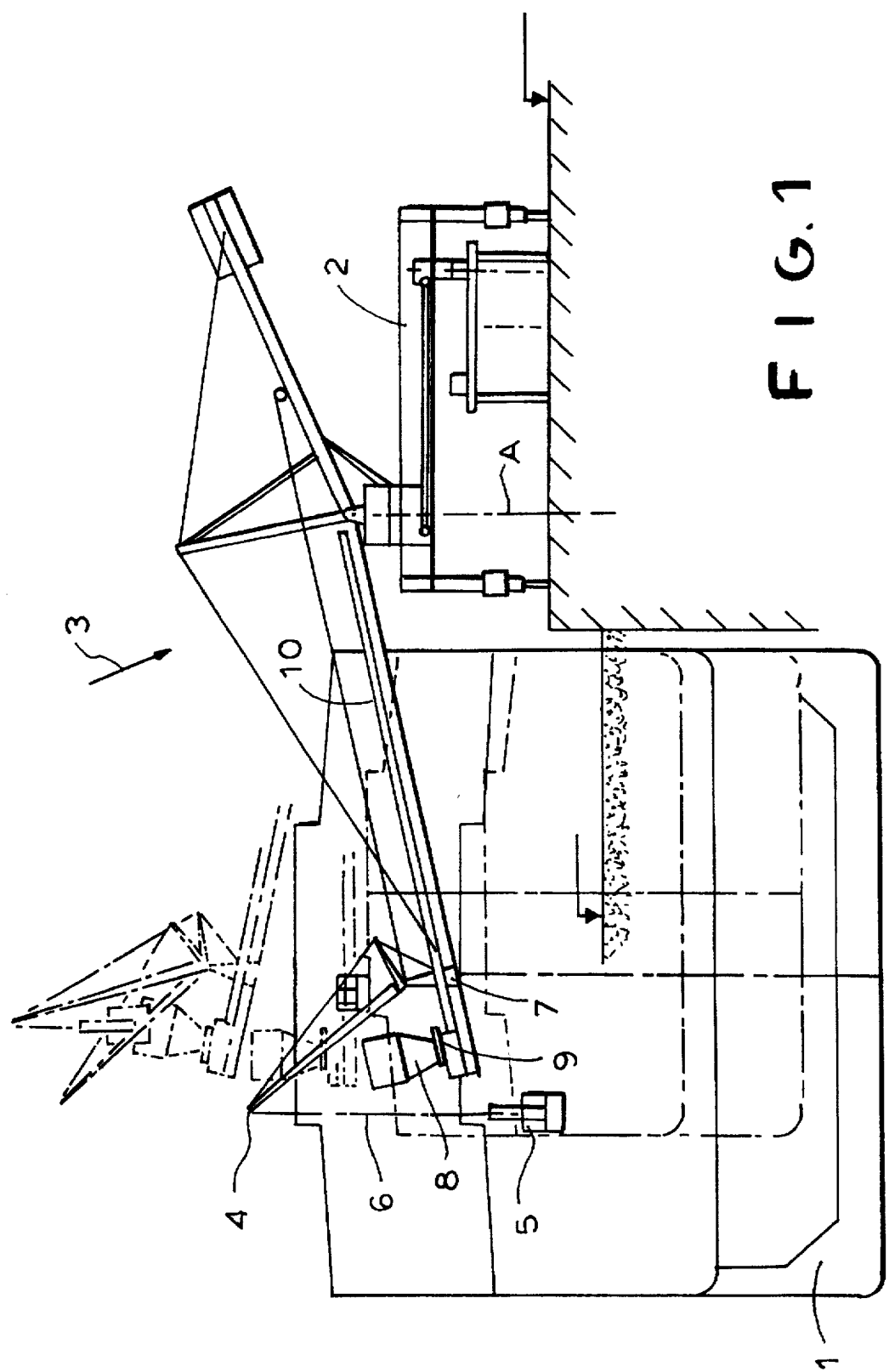
FIG. 1 is a schematic representation of an apparatus in side view.

The apparatus shown in FIG. 1 has a portal 2 movable parallel to the ship 1 to be unloaded and carrying a raisable and lowerable boom 3. The boom 3 is pivotal about an axis A. On the water-side end of the boom 3 there is a pivotal outrigger arm 4 that is guided by a lift cable 6 carrying a grab 5. The lift cable 6 is moved by a winch 7 arranged in the rear region of the pivotal outrigger arm 4.

Also on the water-side end of the boom 3 is a catch bin 8 below which is provided a takeout organ, for example a takeoff belt 9 or a takeoff trough or the like. A boom belt 10 is arranged on the boom 3 also that extends up to underneath the catch bin 8.

After the grab 5 has taken the bulk material out of the ship 1 it is lifted by the cable 6 to near the edge of the catch bin 8 and then swung by the outrigger arm 4 into its dump position over the catch bin 8. Then the grab 5 opens and the bulk material falls into the catch bin 8. The takeoff belt 9 underneath the catch bin 8 draws off the material continuously in doses. Then the bulk material is transferred to the boom belt 10 on the boom 3. The boom belt 10 drops the bulk material at the pivot axis A onto the dock belt that is directly thereunder or, if necessary, onto an additional intermediate conveyor that bridges the gap between the pivot axis and the dock belt.

Figure 2:
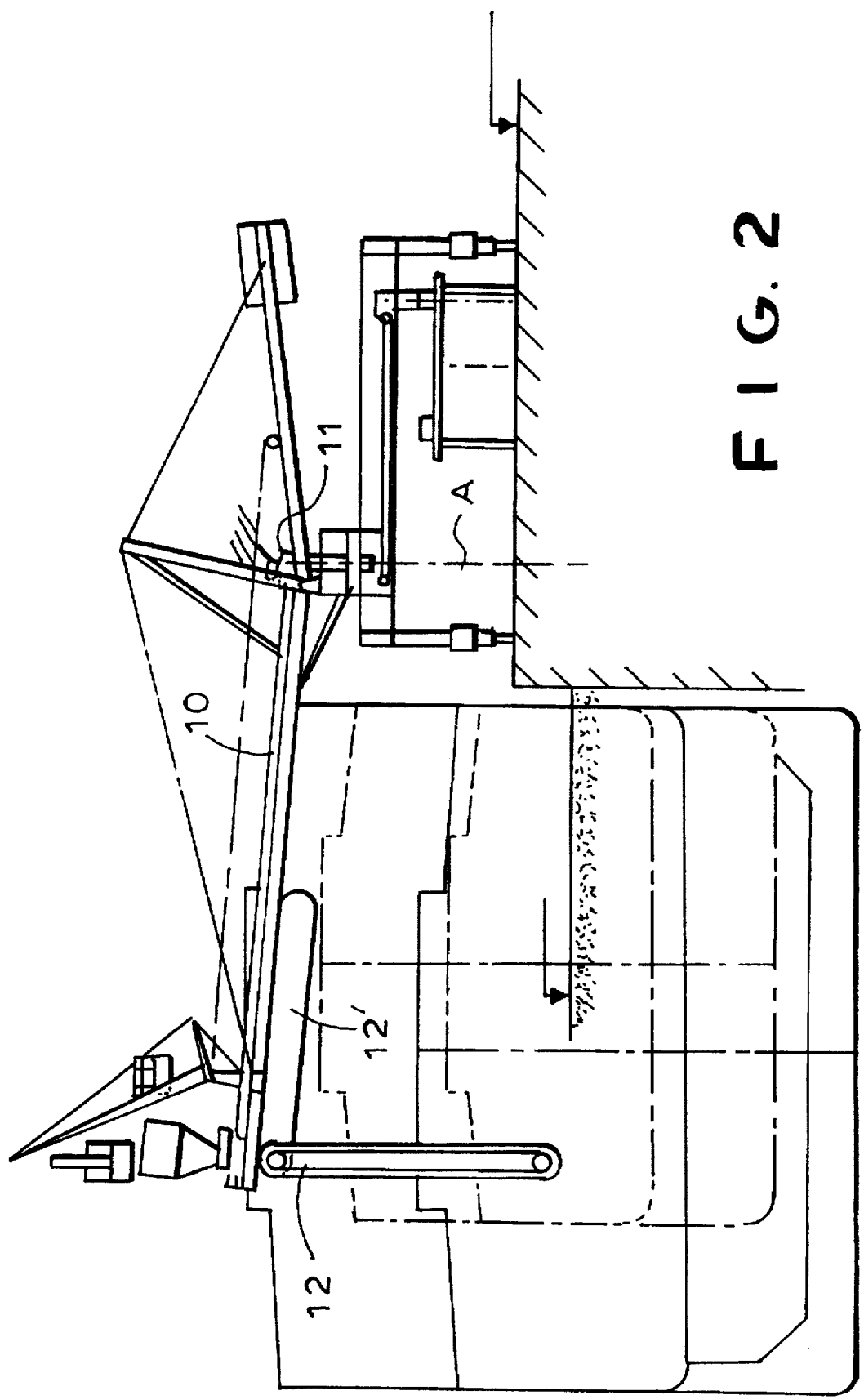
FIG. 2 is a schematic representation of another apparatus also in side view.

In the apparatus shown in FIG. 2 the boom belt 10 is reversible and a loading device 11 is provided in the region of the axis A of the boom 3. In addition a bucket loader 12 is provided on the water-side end of the boom 3.

This apparatus serves for loading ships 1 in that the bulk material is deposited by the loading device 11 on the boom belt and is thence transferred to the bucket loader 12. The bucket loader 12 deposits the bulk material through the hatch of the ship 1.

On use of the apparatus shown in FIG. 2 for unloading a ship 1 the bucket loader 12 is moved into the rest position shown at 12'.

We claim:

1. An apparatus for unloading bulk material from a ship adjacent a dock, the apparatus comprising:
   a portal support movable longitudinally on the dock parallel to the ship;
   a boom having an inner end pivoted about a vertical inner axis on the support and an outer end positionable over the ship;
   a boom conveyor extending between the ends of the boom;
   a catch bin on the outer end of the boom above the boom conveyor;
   an outrigger arm pivotal on the outer end of the boom about an outer axis and having an outer end;
   a cable passing over the outrigger-arm outer end;
   a grab suspended from the cable; and
   means including a winch connected to the cable for raising the grab from a position in a hold of the ship to a position above the catch bin, for pivoting the outrigger arm for positioning the grab above the catch bin, and for dumping material form the garb into the catch bin.

2. The ship-unloading apparatus defined in claim 1 wherein the outer axis is horizontal.

3. The ship-unloading apparatus defined in claim 1, further comprising
   a relatively short dosing conveyor on the outer boom end above the boom conveyor and below the bin for feeding material from the bin onto the boom conveyor.

4. An apparatus for unloading bulk material from a ship adjacent a dock, the apparatus comprising:
   a portal support movable longitudinally on the dock parallel to the ship;
   a boom having an inner end pivoted about an inner axis on the support and an outer end positionable over the ship;
   a boom conveyor formed as a reversible belt and extending between the ends of the boom;
   a catch bin on the outer end of the boom above the boom conveyor;
   an outrigger arm pivotal on the outer end of the boom about an outer axis and having an outer end;
   a cable passing over the outrigger-arm outer end;
   a grab suspended from the cable;
   means including a winch connected to the cable for raising the grab from a position in a hold of the ship to a position above the catch bin, for pivoting the outrigger arm for positioning the grab above the catch bin, and for dumping material from the grab into the catch bin; and
   means for loading bulk material onto the boom conveyor at the inner boom end.

5. The ship-unloading apparatus defined in claim 4 wherein the axis is vertical.

6. The ship-unloading apparatus defined in claim 4, further comprising
   second conveyor means at the outer boom end for conducting bulk material from the outer boom end down into a hold of the ship.

7. The ship-unloading apparatus defined in claim 6 wherein the second conveyor means is a bucket loader.

* * * * *

UNITED STATES PATENT AND TRADEMARK OFFICE
CERTIFICATE OF CORRECTION

PATENT NO. : 5,709,517
DATED : 20 January 1998
INVENTOR(S) : Horst STECKEL and Jürgen ARENDT It is certified that error appears in the above-identified patent and that said Letters Patent is hereby corrected as shown below:

On the title page, item [73] Assignee,
in place of Düsseldorf, read -- Essen --.

Signed and Sealed this

Thirtieth Day of June, 1998

Attest:

BRUCE LEHMAN

*Attesting Officer*    *Commissioner of Patents and Trademarks*